(12) United States Patent
Diewald et al.

(10) Patent No.: US 7,454,412 B2
(45) Date of Patent: Nov. 18, 2008

(54) COMPILING VALUES THAT RELATE TO AGGREGATE DATA

(75) Inventors: Martin Diewald, Walldorf (DE); Jens Weidner, Leimen (DE); Marcus Dill, Wiesloch (DE)

(73) Assignee: SAP Aktiengesellschaft, Walldorf (DE)

( * ) Notice: Subject to any disclaimer, the term of this patent is extended or adjusted under 35 U.S.C. 154(b) by 436 days.

(21) Appl. No.: 10/998,924

(22) Filed: Nov. 29, 2004

(65) Prior Publication Data
US 2006/0004816 A1    Jan. 5, 2006

Related U.S. Application Data

(60) Provisional application No. 60/580,243, filed on Jun. 16, 2004.

(51) Int. Cl.
G06F 7/00 (2006.01)
G06F 17/30 (2006.01)
G06F 17/00 (2006.01)

(52) U.S. Cl. .............................. 707/3; 707/10; 707/100; 707/102; 707/103 Y (58) Field of Classification Search ...................... 707/3, 707/10
See application file for complete search history.

(56) References Cited

U.S. PATENT DOCUMENTS

| | | | |
|---|---|---|---|
| 5,870,746 A | 2/1999 | Knutson et al. | 707/101 |
| 5,930,764 A | 7/1999 | Melchione et al. | 705/10 |
| 5,966,695 A | 10/1999 | Melchione et al. | 705/10 |
| 6,320,586 B1 * | 11/2001 | Plattner et al. | 715/700 |
| 6,792,458 B1 * | 9/2004 | Muret et al. | 709/224 |
| 6,807,518 B1 * | 10/2004 | Lang | 703/2 |
| 6,904,434 B1 * | 6/2005 | Wallach et al. | 707/10 |
| 2002/0077915 A1 * | 6/2002 | Goto et al. | 705/22 |

OTHER PUBLICATIONS

Guo et al. Matching semantic Web services across heterogeneous, Computer and Information Technology, 2005, CIT 2005, Sep. 21-23, 2005, pp. 264-268.*

Zhang et al. Improving min/max aggregration over spatial objects, Geographic Information System, Procedeedings of the 9th ACM intergrational symposium on Advance in geographic information system, 2001, pp. 88-93.*

"Target Group Optimization" downloaded from http://help.sap.com/saphelp_crm40/helpdata, on Nov. 29, 2004, 2 pages.

* cited by examiner

*Primary Examiner*—Baoquoc N To
(74) *Attorney, Agent, or Firm*—Fish & Richardson P.C.

(57) ABSTRACT

A method of compiling values that relate to aggregate data includes providing, from a data warehouse system and to a computer device, an output that causes a visual display of an aggregate data portion on the computer device. The aggregate data portion has been aggregated from selected data records in a data source system. There is received, at the data warehouse system and from the computer device, a user input indicating a request to compile values stored in a field of each of the selected data records. The method includes compiling, in the data warehouse system, the values stored in the field of each of the selected data records. The compiled values may be used to create a target group for a marketing campaign.

17 Claims, 5 Drawing Sheets

COMPILING VALUES THAT RELATE TO AGGREGATE DATA

CROSS-REFERENCE TO RELATED APPLICATION

This application claims priority from U.S. Provisional Application No. 60/580,243, filed Jun. 16, 2004 and entitled "Target Group Generation Using Transactional Data," the entire contents of which are incorporated herein by reference.

TECHNICAL FIELD

This description relates to compiling values that relate to data that has been aggregated in a computer system.

BACKGROUND

Marketing campaigns typically involve campaign activities directed at prospective customers. Before launching the campaign, there usually is created a target group that identifies each of the prospective customers so that the campaign activity can be directed at them, for example by letter or email. The target group typically is created by automatically searching existing customer records for those prospective customers that meet a specific criterion.

Campaign management systems can include a segment builder component that can be used in modeling and creating target groups. First, a user formulates a customer profile that can be applied to the customer list to identify those that meet the specific criteria for being included in the target group. The user must be familiar with different attributes associated with the customers because the segment builder component requires the user both to identify the attribute that should be used and to enter a valid attribute value that is to be used in selecting the prospective customers. The customer profile typically is revised several times so that the target group will have an acceptable size.

Existing solutions for target group generation may have disadvantages. It can be difficult or impossible for a person without expert knowledge to create a target group. Some searches may require use of customer attributes that are unique to the database of customer records and which are may not be familiar to a member of a marketing department that wants to create the target group. Moreover, creating the customer profile may require advanced skills in how to formulate a logic query or how to search a database. These disadvantages may deter some users from learning and using the segment builder.

SUMMARY

The invention relates to compiling values that relate to aggregate data.

In a first general aspect, a method comprises providing, from a data warehouse system and to a computer device, an output that causes a visual display of an aggregate data portion on the computer device. The aggregate data portion has been aggregated from selected data records in a data source system. There is received, at the data warehouse system and from the computer device, a user input indicating a request to compile values stored in a field of each of the selected data records. The method comprises compiling, in the data warehouse system, the values stored in the field of each of the selected data records.

In selected embodiments, the compiled values are forwarded to a campaign management application program. There may exist several data source systems with respective campaign management application programs and the user may choose to have the compiled values forwarded to at least one of the several data source systems. When creating the target group those of the identifiers may be ignored that relate to entities that are not recognized in the chosen at least one data source system.

In selected embodiments, the aggregate data portion is one selected from the group consisting of: a table entry, a segment of a displayed graph, and combinations thereof.

In a second general aspect, a method comprises providing, from a data warehouse system and to a computer device, an output that causes a visual display of an aggregate data portion on the computer device. The aggregate data portion has been aggregated from selected data records in a data source system. There is received, at the data warehouse system and from the computer device, a user input indicating a request to compile identifiers for entities that are to be made members of a target group. The identifiers are stored in a field of each of the selected data records. The method comprises compiling the identifiers in the data warehouse system such that the entities can be made the members of the target group.

Advantages of the systems and techniques described herein may include any or all of the following: Providing a new way of creating a target group for a marketing campaign; providing a new way of compiling names of products that contribute to a specific transactional figure; eliminating the need for expert knowledge in modeling a target group; improving efficiency in creating target groups; and providing an improved way of compiling values that relate to aggregate data.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
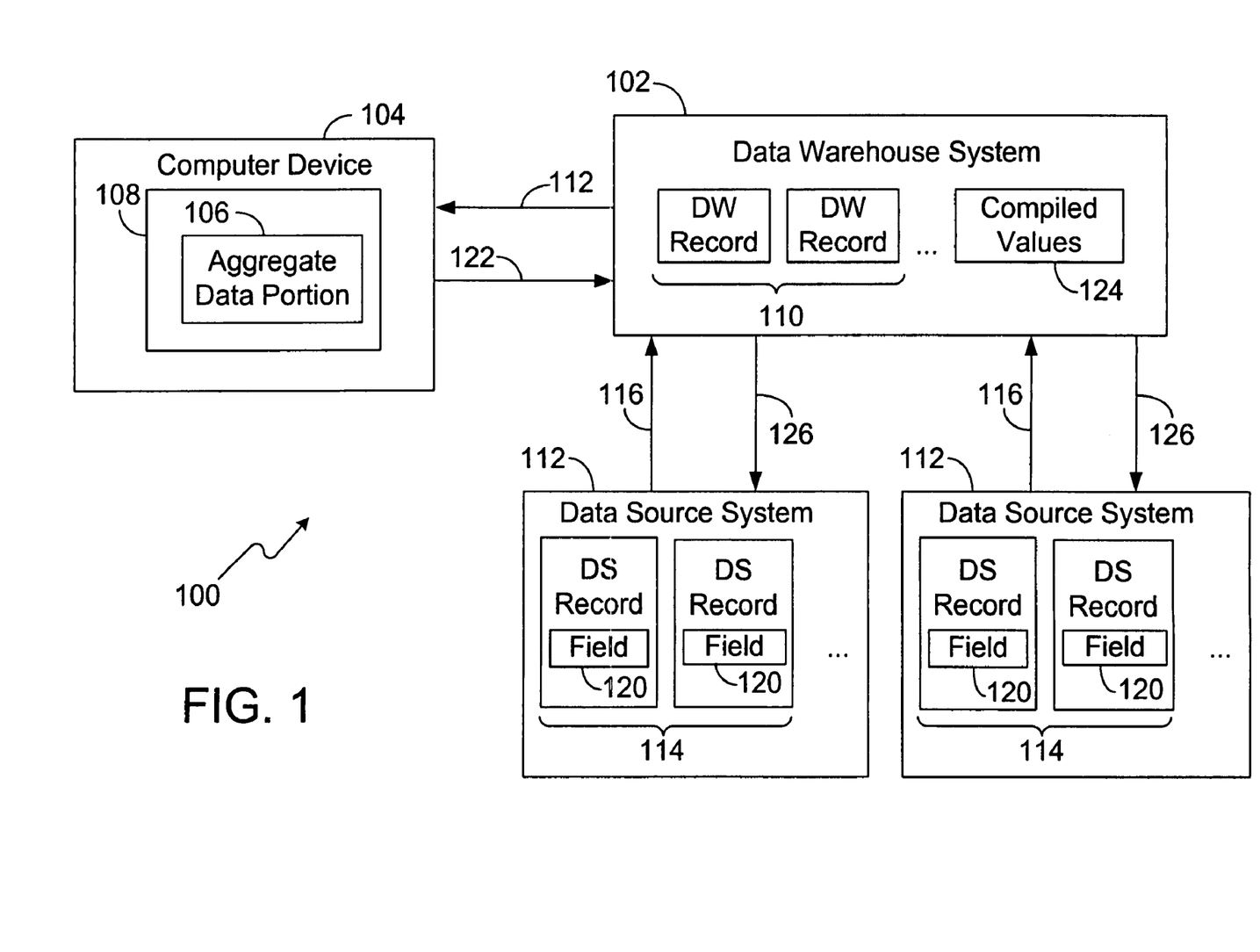
FIG. 1 is a block diagram of a computer system that compiles values that relate to aggregate data.

FIG. 1 shows a system 100 that compiles values that relate to aggregate data. A user that reviews a specific aggregate data portion, such as a sales figure, can trigger the system to compile field values relating to the sales figure. For example, the system can compile a list of the customers who contributed to the sales figure, and use the list to create a target group of the customers.

The system 100 includes a data warehouse system 102 that receives transactional data from a backend system and processes the data for providing certain outputs to users. For example, a user can access the data warehouse system using a computer device 104 and request display of a specific report that reflects some aspect of the organization's business activities. Here, the report includes an aggregate data portion 106 and may be displayed in a graphical user interface (GUI) 108 on the computer device. In other examples, the report may include several aggregate data portions.

The displayed report may be based on one or more data warehouse records 110 in the data warehouse system 102. Particularly, the data warehouse system may generate the records 110 by performing queries on the backend, here one or more data source systems 112. Each of the data source systems may contain one or more records 114 that it generates as part of its typical operation. For example, the data source records 114 may correspond to sales activities. Accordingly, the data warehouse system 102 may retrieve the information stored in the records 114, as indicated by arrows 116, and process the information to generate a report on the sales activities.

The data warehouse system may generate the report as part of a scheduled process or upon the user's request. Upon the data warehouse system generating the report, it may provide an output to the computer device, as indicated by arrow 118, that causes a visual display of the aggregate data portion 106 on the computer device. The aggregate data portion was aggregated from at least one of the data records 114 in the data source system(s). The user can now review the generated report, including the aggregate data portion 106 which may be a sales figure.

In this example, the user wants the system 100 to compile values that in a specific way relate to the aggregate data portion. Particularly, each of the data source records 114 may contain one or more fields 120 containing a value. For example, when the records 114 correspond to sales activities the field 120 may identify the customer or product involved in the respective transactions.

The user makes an input from the computer device, indicated by an arrow 122, which is received in the data warehouse system. The input indicates a request to compile the values stored in the field 120 of the at least one of the records 114 from which the aggregate data portion 106 was aggregated. Thus, the request may involve compiling values from fewer than all of the records 114. The data warehouse system 102 compiles the values by accessing one or more of the data warehouse records 110. The compiled values 124 may be stored in the data warehouse system and may be forwarded to one or more of the data source system 112, as indicated by arrows 126.

Figure 2:
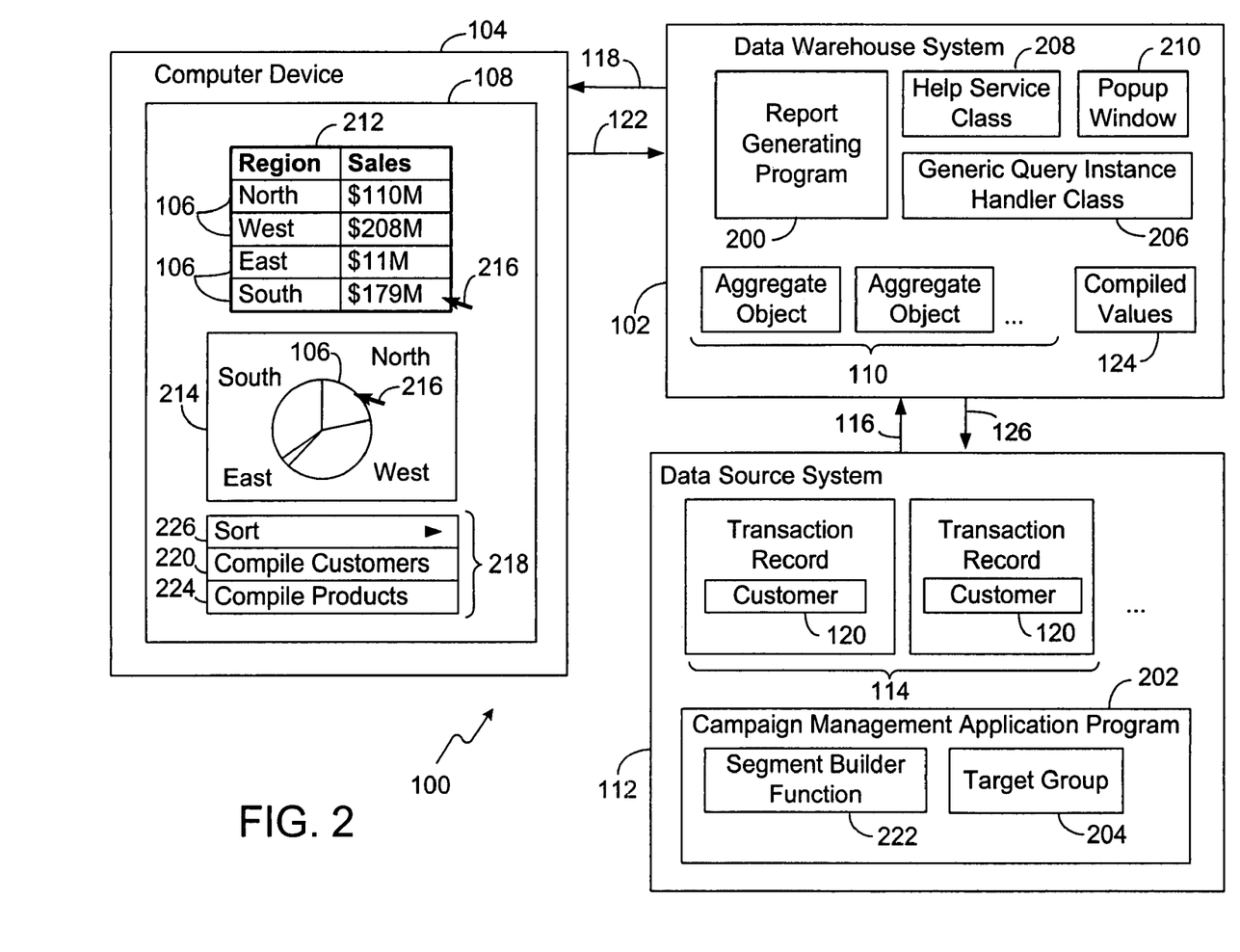
FIG. 2 is another block diagram with examples of features in the system shown in FIG. 1.

FIG. 2 shows examples of features that can be included in the system 100. The data warehouse system 102, which may be the Business Information Warehouse system from SAP AG in Walldorf (Baden), Germany, includes a report generating program 200 that the user can trigger to generate and present reports on various aspects of the data available in the data source system 112. The data source system, which may be a Customer Relationship Management (CRM) system from SAP AG, includes a campaign management application program 202 that can be used to create and execute marketing campaigns directed at a target group 204.

The data warehouse system 102 includes a generic query instance handler class 206 that handles the various queries that the data warehouse system can run on the backend data. Particularly, the class 206 can compile the values stored in the data record field of the data source records that contribute to an aggregate data portion. The data warehouse system also includes a help service class 208 that enables the user to request compilation of the values and that can forward the compiled values 124 to the data source system 112. The help service class can generate a popup window 210 for display in the GUI 108, which popup window lets the user specify details regarding the target group 204 that can be created using the compiled values 124.

Here, the data warehouse system 102 generates a report to be presented to the user. The report is generated using one or more of the data warehouse records 110, which in this example are aggregate objects containing data obtained from the data source system 112. For example, each of the aggregate objects 110 is the result of a query performed by the generic query instance handler class 206. The query retrieves data from the data source records 114, which in this example are transaction records, such as records of sales transactions. The field 120 in each of the transaction records 114 here identifies the customer that participated in the transaction.

The report includes a sales summary 212 that is displayed in the GUI 108. Here, the sales summary is a table that lists aggregate sales based on several sales transactions. The sales figures are currently divided between four regions: North, West, East and South. Each sales figure is aggregated using the information in the selected ones of the transaction records 114 relating to the particular region. The sales transactions that contribute to any of the sales figures may involve more than one customer. The sales transactions that contribute to any of the sales figures may involve more than one product. The report also includes a graph 214 that in this example is a pie chart of the sales figures for the respective regions. Each of the sales figures and each segment of the graph 214 is an example of the aggregate data portion 106.

The GUI 108 allows the user to trigger creation of a target group to include those customers that contributed to a selected one of the sales figures. For example, the user finds the sales figure for the South region ($179 million) particularly interesting and wants to contact the underlying customers in an upcoming marketing campaign. The user may trigger the target group creation by activating a designated link, button or command that is associated with the selected sales figure.

In this example, the command is included in a context menu for the selected sales figure. The user may place a pointer 216 on the sales figure's cell in the summary 212 (for example, on the sales figure or on its associated "South" label) and click the right mouse button to open a context menu 218 for the selected sales figure. The context menu 218 may look different depending on the selected aggregate data portion. Here, the user selects a "Compile Customers" command 220 in the context menu 218, for example using the pointer 216. This causes the input 122 indicating that the user wants the data warehouse system 102 to compile the customers that contributed to the selected sales figure. The data warehouse system, upon receiving the input, compiles the values 124.

The data warehouse system 102 can forward the compiled values 124. For example, the compiled values can be forwarded to the campaign management application program 202 in the data source system 112, where the target group 204 can be created from the compiled values 124. Particularly, a segment builder function 222 within the campaign management application program can handle the target group creation. In some implementations, the segment builder 222 may be separate from the campaign management application program.

The context menu 218 may include a "Compile Products" command 224. The user can select this command to cause the data warehouse to compile the products that contributed to the selected sales figure. That is, upon seeing a sales figure, the user may want to identify the underlying products for the purpose of increasing advertising for them. Thus, the compiled values 124 in such an example may include a list of products that relate to the sales figure, and this list can be forwarded to the campaign management application program 202 for further action.

The user can trigger similar operations from any segment of the graph 214, because each of the segments is an example of the aggregate data portion 106. For example, the user can click the right mouse button while pointing to the segment for the North sales region. The context menu 218 will be displayed in the GUI 108, and the user can select a command for compiling the associated values, such as the underlying customers or products. In particular implementations, the graph 214 is supplemented by a non-displayed table containing the relevant data. For example, the report provided to the computer device may include the non-displayed table and executable code for creating the graph 214 on the computer device from the table.

The report provided by the data warehouse system for display on the computer device 104 may allow the user to do further navigation on the particular data included therein. For example, the user can have the data broken down by an additional or a different criterion, such as by business unit or by quarter year. The report may provide powerful functions, controlled by commands displayed in the GUI 108, for triggering such "slicing and dicing" of the provided data. For example, the context menu 218 may include a "Sort" sub-menu 226 (currently in a closed position) with various commands for manipulating the available data.

Figure 3:
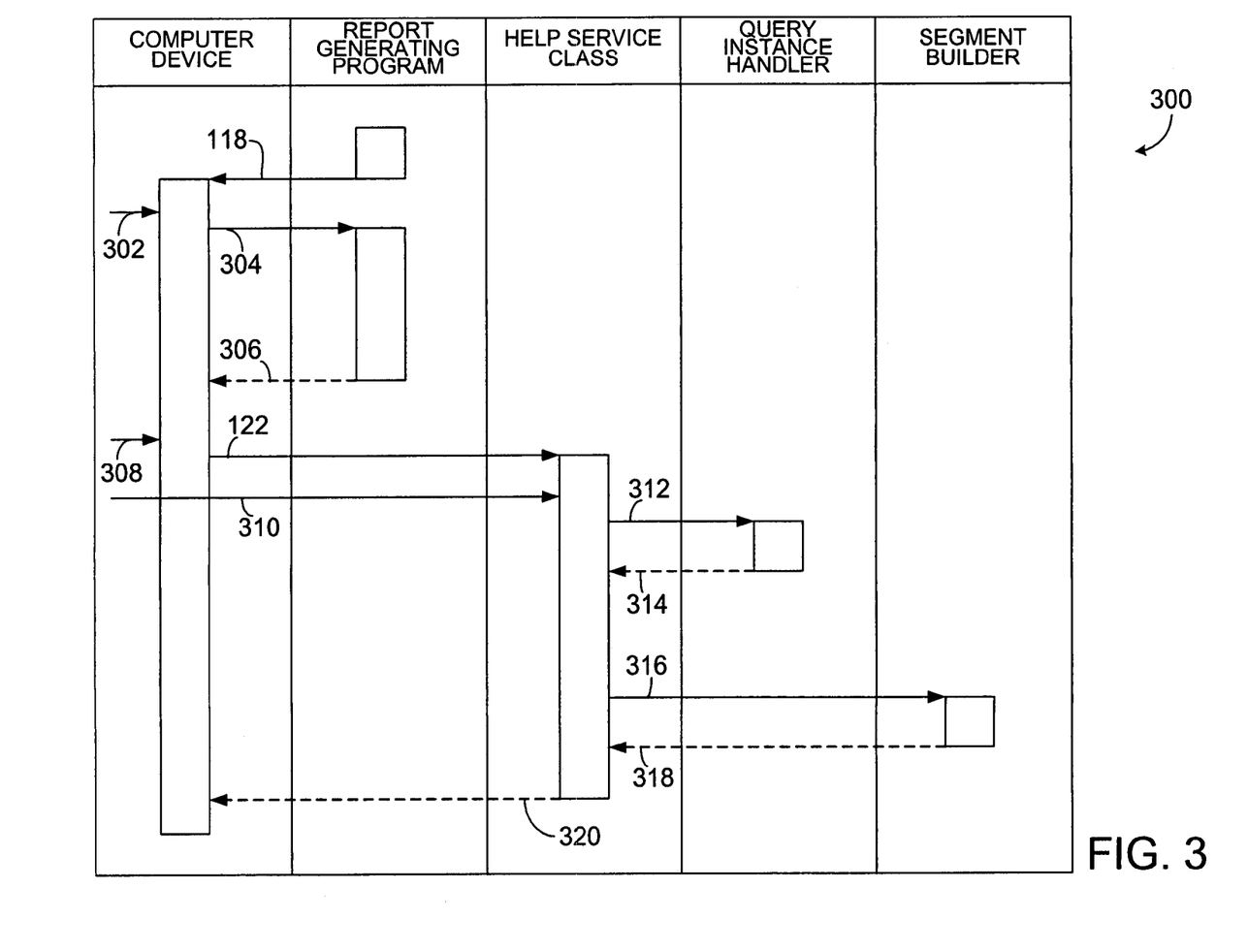
FIG. 3 is a sequence diagram of an exemplary operation performed in the system shown in FIG. 2.

FIG. 3 is a sequence diagram of a sequence 300 that can be performed in the system 100. The sequence 300 may begin with the report-generating program 200 generating the report that in the output 118 is forwarded to the computer device 104 for display. For example, the user may have triggered the report-generating program to generate the specific report.

The user may make an input to the computer device, indicated by arrow 302, to manipulate the data that is included in the report. For example, the user wants the data broken down by a different characteristic, or wants to perform a drilldown on a particular category of data. The report generating program in the data warehouse system receives a corresponding input 304, performs the required processing such as running a supplemental query, and then provides another output 306 that contains the new navigational state of the report to be displayed on the computer device. The user can repeat this procedure, i.e., continue navigating, until the user is satisfied with the data that is included in the report. Accordingly, steps corresponding to the arrows 302, 304 and 306 may be performed repeatedly in the sequence 300.

Upon selecting a particular aggregate data portion, the user can click on the "Compile Customers" or "Compile Products" command in the context menu, as indicated by an arrow 308. This causes the input 122 to be made to the data warehouse system. In response to the input 122, the help service class 208 may display the popup window 210 on the computer device 104. In the popup window, the user may specify details regarding the target group that are received as an input 310.

For example, the popup window 210 may allow the user to specify one or more of several data source systems 112 to which the compiled values are to be forwarded. If several such systems have respective campaign management programs, the user may wish to choose particular one(s) thereof for the target group that is to be created. As another example, the user can forward the compiled values 124 to several (or all) of such data source systems, and each individual system can identify those customers or products that is recognizes. Accordingly, upon sending the compiled values to several systems, those of the compiled values that relate to non-recognized entities may be ignored.

As another example, the popup window 210 may allow the user to enter the name of the target group for which the compiled values 124 are to be used. If the name does not already exist, a target group is created using the compiled values and the entered name is assigned to it. If a target group with the entered name exists, the compiled values may be added to that target group, for example in the campaign management application program 202. Also, when the campaign management application program creates target groups by running customer profiles against a database, the popup window may allow the user to select a profile set (which can include one or more profiles), to have the created target group be associated with any other target group already included in the profile set.

Upon receiving the input 122, and optionally the user-specified details in the input 310, the help service class 208 causes the generic query instance handler class 206 to compile the values that contribute to the selected aggregate data portion, as indicated by an arrow 312. For example, this may involve adding a criterion to the query that corresponds to the current navigational state of the report. The additional criterion may configure the query to particularly retrieve the values stored in the field 120 of the selected data records. That is, the generic query instance handler class may be configured to recognize and retrieve the sought customers or products from the selected data records. The query instance handler may return the compiled values 124 as indicated by an arrow 314.

The help service class may forward the compiled values 124 to the segment builder function 222, as indicated by arrow 316. The segment builder, in turn, may create a new target group from the compiled values or may add the listed customers to an existing target group. The segment builder then returns control as indicated by an arrow 318. The help service class may return control as indicated by an arrow 320.

While not explicitly shown in the sequence diagram 300, the created target group may later be used in a marketing campaign, for example using the campaign management application program 202.

Figure 4:
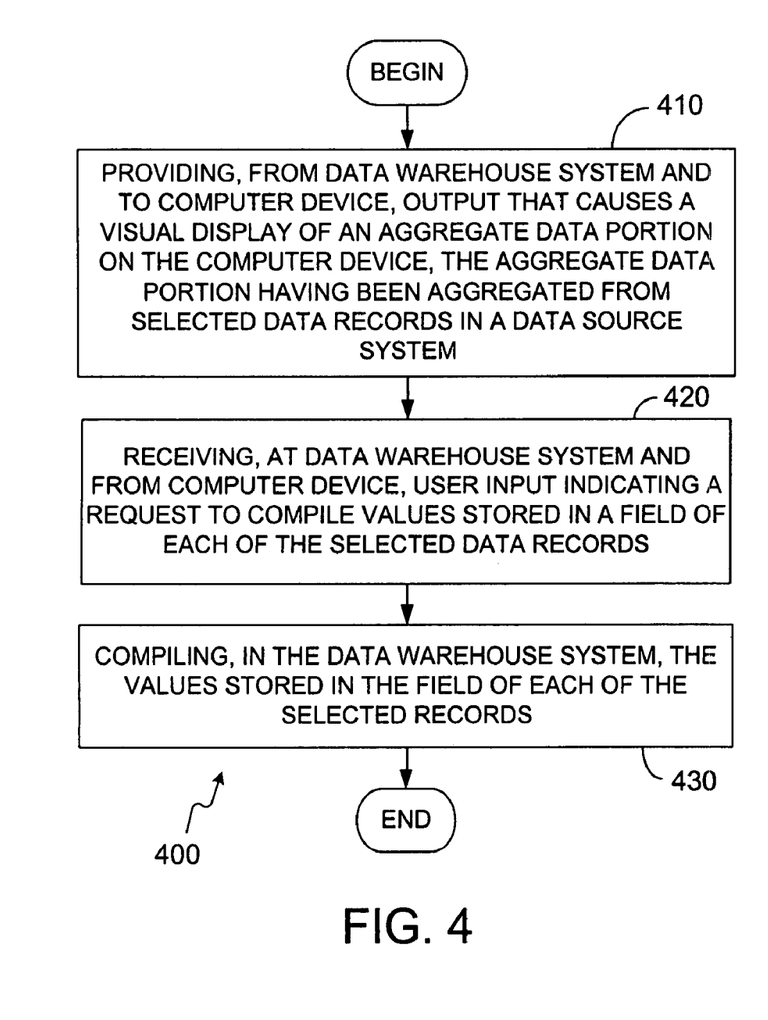
FIGS. 4 and 5 are flow charts of embodiments of inventive methods.
Figure 5:
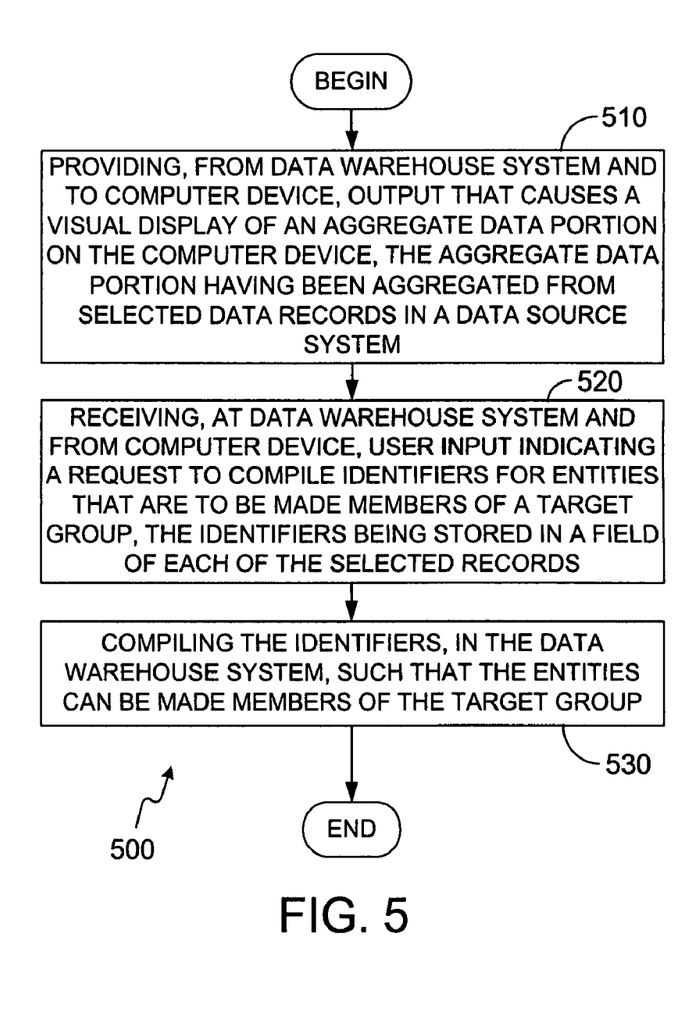

FIGS. 4 and 5 are embodiments of respective inventive methods 400 and 500. The methods 400 and 500 may be performed in the system 100. For example, a computer program product may include instructions that cause a processor to perform operations comprising the steps of any or both of the methods. As shown in FIG. 4, the method 400 includes the following steps:

Providing, in step 410, from a data warehouse system and to a computer device, an output that causes a visual display of an aggregate data portion on the computer device, the aggregate data portion having been aggregated from selected data records in a data source system. For example, the data warehouse system 102 can provide, to the computer device 104, the output 118 that causes the aggregate data portion 106 to be displayed. The aggregate data portion was aggregated from selected ones of the records 114 in the data source system 112 and may for example be a sales figure in form of a table entry in the summary 212 or a segment in the graphic 214.

Receiving, in step 420, at the data warehouse system and from the computer device, a user input indicating a request to compile values stored in a field of each of the selected data records. For example, the user selects the South region aggregate data portion in the summary 212 or in the graph 214. The user triggers the input 122 by selecting the "Compile Customers" command 220 or "Compile Products" command 224 in the context menu for the selected sales figure. The input 122 may be received by the help service class 208.

Compiling, in the data warehouse system, the values stored in the field of each of the selected data records. For example, the generic query instance handler class 206 compiles the values and creates the compiled values 124. The values are identified as being stored in the fields 120 of the data source records 114 and the generic query instance handler class may access them in the aggregate object(s) 110.

As shown in FIG. 5, the method 500 includes the following steps:

Providing, in step 510, from a data warehouse system and to a computer device, an output that causes a visual display of an aggregate data portion on the computer device, the aggregate data portion having been aggregated from selected data records in a data source system. This step is analogous to step 410 in the above-described method 400.

Receiving, in step 520, at the data warehouse system and from the computer device, a user input indicating a request to compile identifiers for entities that are to be made members of a target group, the identifiers being stored in a field of each of the selected data records. For example, the user selects the South region aggregate data portion in the summary 212 or in the graph 214. The user triggers the input 122 by selecting the "Compile Customers" command 220 or "Compile Products" command 224 in the context menu for the selected sales figure. The input 122 may be received by the help service class 208. For example, the request may involve creating or updating the target group 204.

Compiling the identifiers, in step 530, in the data warehouse system, such that the entities can be made members of the target group. For example, the generic query instance handler class 206 compiles the values into the compiled values 124, which is structured such that the segment builder function 222 can use it to create the target group 204. The compiled values may include customer identifiers or product identifiers that the segment builder function recognizes.

Figure 6:
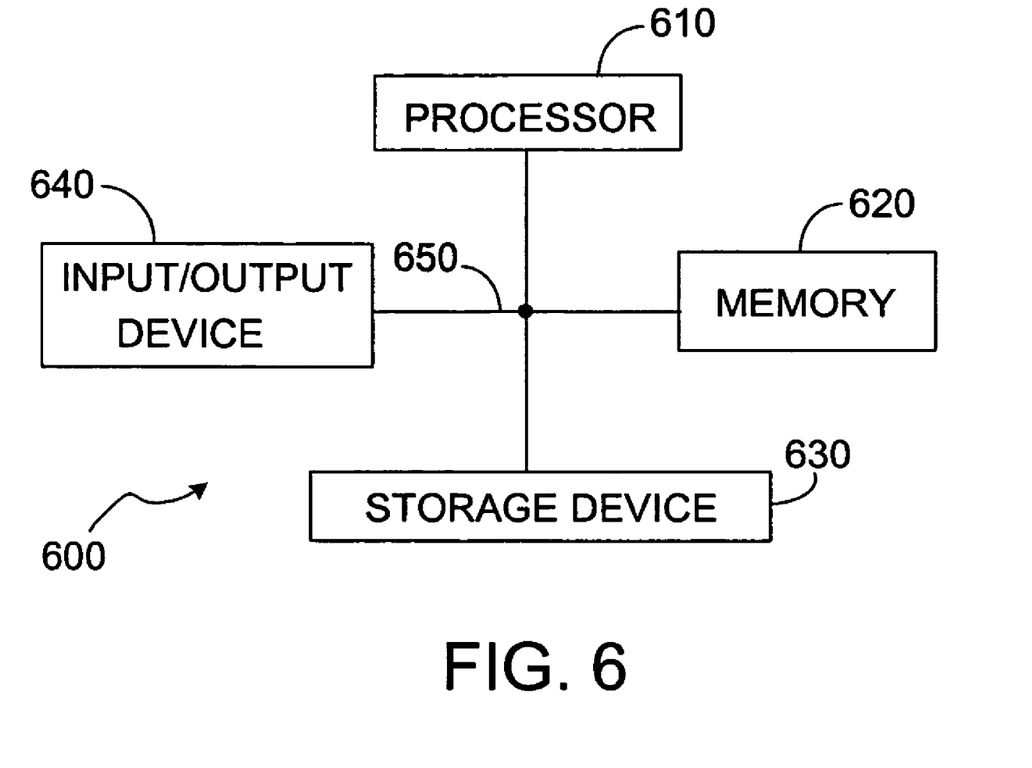
FIG. 6 is a block diagram of a general computer system.

FIG. 6 is a block diagram of a computer system 600 that can be used in the operations described above, according to one embodiment. For example, the system 600 may be included in either or all of the data warehouse system 102, computer device 104, and data source system(s) 112.

The system 600 includes a processor 610, a memory 620, a storage device 630 and an input/output device 640. Each of the components 610, 620, 630 and 640 are interconnected using a system bus 650. The processor 610 is capable of processing instructions for execution within the system 600. In one embodiment, the processor 610 is a single-threaded processor. In another embodiment, the processor 610 is a multi-threaded processor. The processor 610 is capable of processing instructions stored in the memory 620 or on the storage device 630 to display graphical information for a user interface on the input/output device 640.

The memory 620 stores information within the system 600. In one embodiment, the memory 620 is a computer-readable medium. In one embodiment, the memory 620 is a volatile memory unit. In another embodiment, the memory 620 is a non-volatile memory unit.

The storage device 630 is capable of providing mass storage for the system 600. In one embodiment, the storage device 630 is a computer-readable medium. In various different embodiments, the storage device 630 may be a floppy disk device, a hard disk device, an optical disk device, or a tape device.

The input/output device 640 provides input/output operations for the system 600. In one embodiment, the input/output device 640 includes a keyboard and/or pointing device. In one embodiment, the input/output device 640 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of generating a list of values that relate to aggregate data, the method comprising:
   providing, from a data warehouse system and to a computer device, an output that causes a visual display of aggregate data portions to be generated on the computer device, the aggregate data portions being (i) selected from the group consisting of: a table entry, a segment of a displayed graph, and combinations thereof, and (ii) created by being aggregated from selected data records in a data source system;
   receiving, at the data warehouse system and from the computer device after the visual display is generated, a first user input indicating that a user has selected at least one of the aggregate data portions in the visual display and requests a list of values relating to the selected at least one aggregate data portion, the requested values being stored in a field of each of the selected data records from which the selected at least one aggregate data portion was aggregated;
   generating, in the data warehouse system and in response to the first user input, the list of the values stored in the field of each of the selected data records from which the selected at least one aggregate data portion was aggregated, the values being identifiers for entities that are to be made members of a target group in a marketing campaign;
   receiving, at the data warehouse system and from the computer device after the visual display is generated, a second user input indicating that the user has selected at least one of several data source systems having respective campaign management application programs; and
   forwarding the generated list of the values to the respective campaign management application program of the selected data source system, wherein those of the identifiers that relate to entities that are not recognized in the selected data source system are omitted.

2. The method of claim 1, wherein the selected data records correspond to performed transactions and wherein the values are identifiers for entities involved in the transactions.

3. The method of claim 1, wherein the user specifies a name for the target group.

4. The method of claim 3, wherein the name is already assigned to an existing target group, further comprising adding the generated list of identifiers to the existing target group.

5. The method of claim 1, wherein the values are identifiers for products that relate to the selected at least one aggregate data portion.

6. The method of claim 5, wherein the selected at least one aggregate data portion is a sales figure and wherein sales of each of the products contribute to the sales figure.

7. The method of claim 1, wherein the data warehouse system obtains the aggregate data portions by a query before providing the output, and wherein generating the list of the values comprises performing the query with an additional criterion.

8. The method of claim 7, wherein the additional criterion configures the query to retrieve the values stored in the field of each of the selected data records.

9. The method of claim 1, wherein the data warehouse system has stored therein the values upon providing the output.

10. The method of claim 9, wherein generating the list of the values comprises accessing the values stored in the data warehouse system.

11. The method of claim 9, wherein the data warehouse system includes a copy of the selected data records, the copy being obtained from the data source system.

12. The method of claim 1, wherein the selected at least one aggregate data portion is the segment of the displayed graph, and wherein the displayed graph is supplemented by a table that is provided to the computer device and not displayed with the graph.

13. The method of claim 1, further comprising creating a user-selectable command that is displayed on the computer device, wherein the user makes the first user input with the user-selectable command.

14. The method of claim 13, wherein the user-selectable command is displayed in a context menu associated with the selected at least one aggregate data portion.

15. A computer program product tangibly embodied in a computer-readable medium, the computer program product including instructions that, when executed, cause a processor to perform operations comprising:
   provide, from a data warehouse system and to a computer device, an output that causes a visual display of aggregate data portions to be generated on the computer device, the aggregate data portions being (i) selected from the group consisting of: a table entry, a segment of a displayed graph, and combinations thereof, and (ii) created by being aggregated from selected data records in a data source system;
   receive, at the data warehouse system and from the computer device after the visual display is generated, a user first input indicating that a user has selected at least one of the aggregate data portions in the visual display and requests a list of values relating to the selected at least one aggregate data portion, the requested values being stored in a field of each of the selected data records from which the selected at least one aggregate data portion was aggregated;
   generate, in the data warehouse system and in response to the user input, the list of the values stored in the field of each of the selected data records from which the selected at least one aggregate data portion was aggregated, the values being identifiers for entities that are to be made members of a target group in a marketing campaign;
   receive, at the data warehouse system and from the computer device after the visual display is generated, a second user input indicating that the user has selected at least one of the several data source systems having respective campaign management application programs; and
   forward the generated list of the values to the respective campaign management application program of the selects data source system, wherein those of the identifiers that relate to entities that are not recognized in the selected data source system are omitted.

16. A method of compiling identifiers that relate to aggregate data, the method comprising:
   providing, from a data warehouse system and to a computer device, an output that causes a visual display of an aggregate data portion to be generated on the computer device, the aggregate data portion being (i) selected from the group consisting of: a table entry, a segment of a displayed graph, and combinations thereof, and (ii) created by being aggregated from selected data records in at least one of several data source systems, the several data source systems having respective campaign management application programs;

receiving, at the data warehouse system and from the computer device after the visual display is generated, a first user input indicating a request to compile identifiers for entities that are to be made members of a target group in a marketing campaign, the identifiers being stored in a field of each of the selected data records, the visual display configured for a user to make the first user input;

compiling, in the data warehouse system and in response to the first user input, the identifiers stored in the field of each of the selected data records;

receiving, at the data warehouse system and from the computer device after the visual display is generated, a second user input indicating that the user has selected at least one of the several data source systems; and forwarding the compiled identifiers to the respective campaign management application program of the selected data source system, wherein those of the identifiers that relate to entities that are not recognized in the selected data source system are omitted.

17. A method of compiling values that relate to aggregate data, the method comprising:

providing, from a data warehouse system and to a computer device, an output that causes a visual display of an aggregate data portion to be generated on the computer device, the aggregate data portion (i) created by being aggregated from selected data records in a data source system, and (ii) being a segment of a displayed graph, and wherein the displayed graph is supplemented by a table that is provided to the computer device and not displayed with the graph;

receiving, at the data warehouse system and from the computer device after the visual display is generated, a first user input indicating a request to compile values stored in a field of each of the selected data records, the visual display configured for a user to make the first user input;

compiling, in the data warehouse system and in response to the first user input, the values stored in the field of each of the selected data records, the values being identifiers for entities that are to be made members of a target group in a marketing campaign;

receiving, at the data warehouse system and from the computer device after the visual display is generated, a second user input indicating that the user has selected at least one of several data source systems having respective campaign management application programs; and forwarding the compiled values to the respective campaign management application program of the selected data source system, wherein those of the identifiers that relate to entities that are not recognized in the selected data source system are omitted, and wherein the data warehouse system obtains the aggregate data portion by a query before providing the output, and wherein compiling the values comprises performing the query with an additional criterion that configures the query to retrieve the values stored in the field of each of the selected data records.

* * * * *